T. M. HUGHS.
HOSE ATTACHMENT.
APPLICATION FILED JULY 29, 1918.
1,310,866.
Patented July 22, 1919.
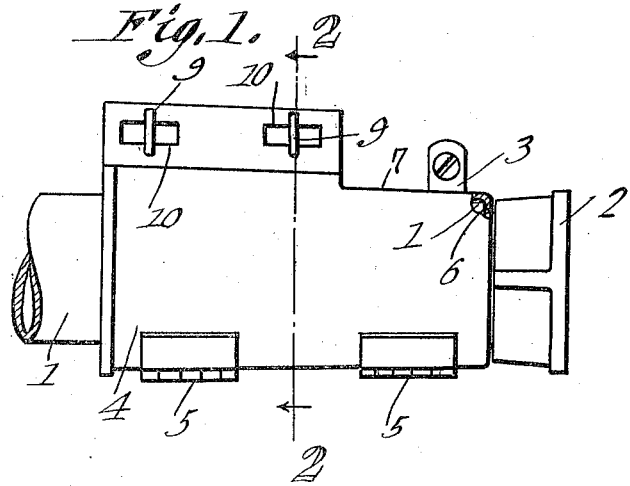
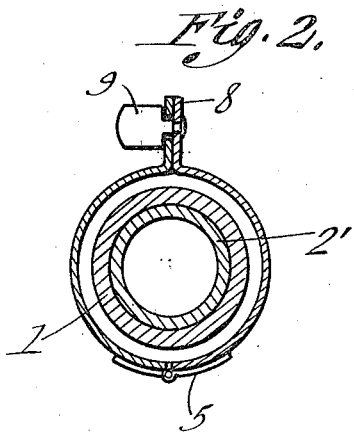
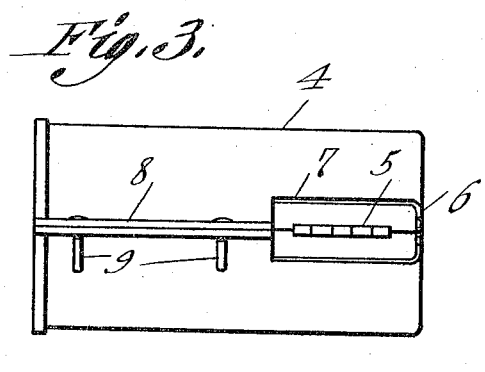
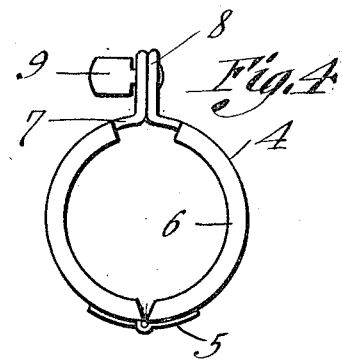
T. M. Hughs
Inventor

UNITED STATES PATENT OFFICE.

THOMAS MASON HUGHS, OF SAN JOSE, CALIFORNIA.

HOSE ATTACHMENT.

1,310,866.   Specification of Letters Patent.   Patented July 22, 1919.

Application filed July 29, 1918. Serial No. 247,196.

*To all whom it may concern:*

Be it known that I, THOMAS M. HUGHS, a citizen of the United States, residing at San Jose, in the county of Santa Clara and State of California, have invented a new and useful Hose Attachment, of which the following is a specification.

The subject of this invention is an attachment for hose intended for use with any form of flexible hose.

With garden hose, or other hose which is constantly being drawn from place to place during watering, the continual flexure and strain placed upon the hose at the place where the nipple of the coupling joint ends will cause the hose to break at this place long before the balance of the hose is worn out.

The main object of the invention is the provision of means for overcoming the flexure and strain on a hose at such place.

Another object of the invention is the provision of means for quickly and detachably securing the attachment in place.

The invention also contemplates generally improving the construction and enhancing the utility of hose attachments.

With the foregoing and other objects in view which will apear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in side elevation of an attachment constructed in accordance with the invention, and shown in place upon a hose;

Fig. 2 is a cross section on the line 2—2 of Fig. 1;

Fig. 3 is a plan view of the device;

Fig. 4 is an end elevation of the same.

Referring to the drawings by numerals of reference:—

A portion of hose is shown and indicated by the numeral 1, and to this hose is attached the coupling member 2 which is rotatable on the end of a nipple 2′, which nipple extends within the end of the hose, and the hose is clamped thereabout by means of the strap 3. This is an ordinary and well known construction to be found on all hose in actual use and is, consequently, not shown in detail.

The attachment consists of a sleeve 4 which is divided longitudinally into two sections joined together by the hinges 5. The sections of the sleeve are formed, at one end, with the inturned flanges 6, which are adapted to engage the end of the hose which abuts the coupling member 2 and so holds the sleeve from slipping upon the hose longitudinally thereof.

The meeting edges of the sections of the sleeve 4, remote from those edges which are connected by the hinges 5, are cut away for a short distance at that end of the sleeve at which the flanges 6 are provided, to form an opening 7 to accommodate the joint of the clamping strap 3. The remaining portion of these meeting edges are bent to form the radially extending flanges 8, which are adapted to engage when the sleeve is in place upon a hose, and in one of these flanges the shanks of buttons 9 are pivotally secured, while the other flange is provided with slots 10 to permit the passage therethrough of the buttons 9 when said buttons are turned to one position. As will be apparent, the buttons serve to lock the sleeve 4 in place on the end of the hose.

It will be noted that the sleeve 4 is made of slightly increased diameter at that end remote from the end at which the flanges 6 are formed. This is for the purpose of allowing sufficient play to the hose to prevent it from being firmly bound at the end of the sleeve and yet not sufficient to permit the hose to bend appreciably at the end of the nipple 2′.

Having thus described the invention, what is claimed as new and sought by Letters Patent, is:—

In a device of the class described, a hose; a nipple in the hose; a coupling rotatable on the nipple beyond the end of the hose; a strap surrounding the hose and binding the same on the nipple, the strap having outstanding ears; a clamping device connecting the ears; and a sleeve comprising hingedly connected trough-like sections surrounding the hose and provided at one end with inturned flanges engaging the end of the hose to the rear of the coupling, the edges of the sections being cut away to receive the ears of the strap, the said edges of the sections being provided with outstanding parallel flanges; and means for connecting the said flanges detachably.

In testimony that I claim the foregoing as my own, I have hereto affixed my signature in the presence of two witnesses.

THOMAS MASON HUGHS.

Witnesses:
W. W. KENVILLE,
THOMAS TOMKIN.

Copies of this patent may be obtained for five cents each, by addressing the "Commissioner of Patents. Washington, D. C."